UNITED STATES PATENT OFFICE.

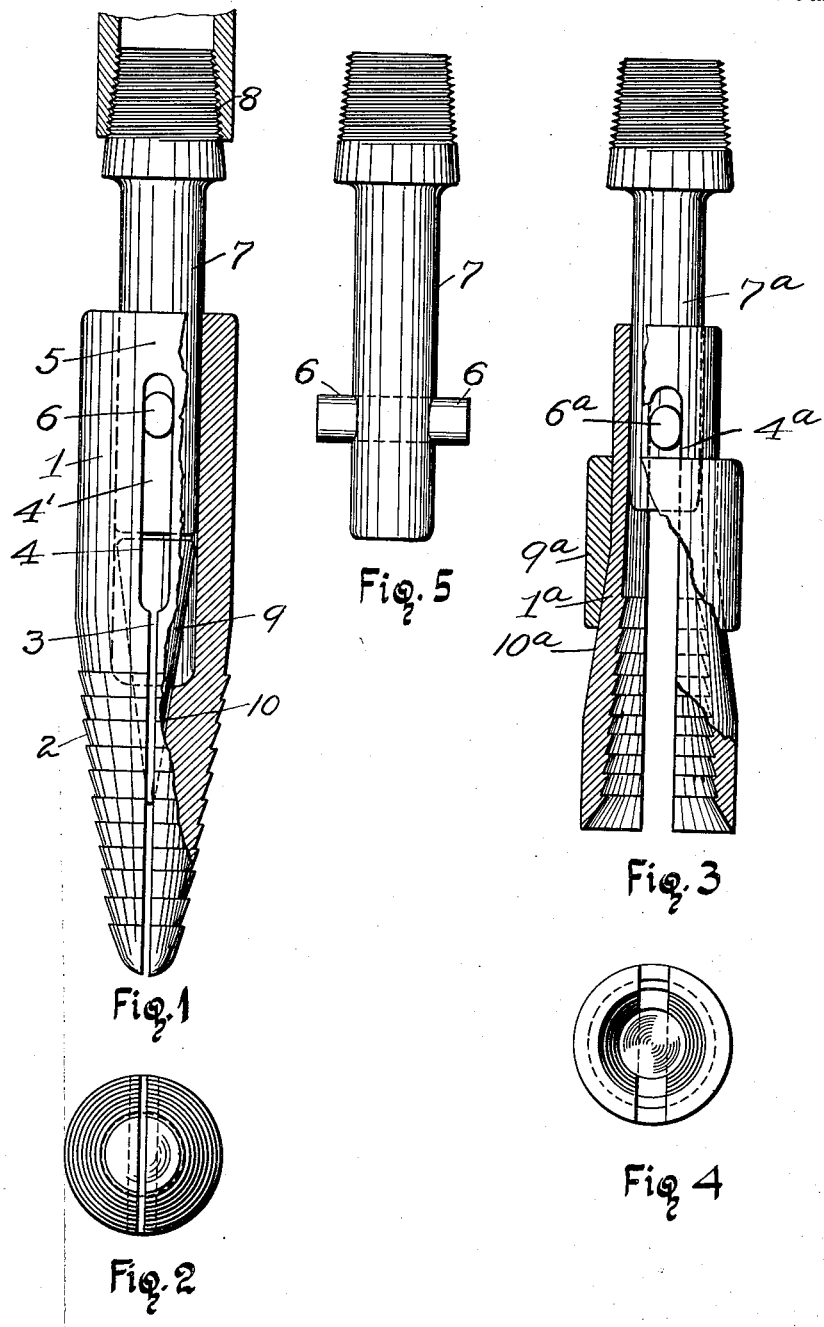

SAM SORENSEN, OF HOUSTON, TEXAS, ASSIGNOR TO C. E. REED, OF HOUSTON, TEXAS.

FISHING DEVICE FOR OIL WELLS.

1,405,025.  Specification of Letters Patent.  Patented Jan. 31, 1922.

Application filed April 6, 1920. Serial No. 371,765.

*To all whom it may concern:*

Be it known that I, SAM SORENSEN, a subject of the King of Denmark, and resident of Houston, in the county of Harris and State of Texas, have invented certain new and useful Improvements in Fishing Devices for Oil Wells, of which the following is a specification.

The invention relates to fishing devices for use in oil wells or in like situations for recovering parts of the drilling appliances which may have become detached or lost in the well.

The invention consists in the features and combination and arrangement of parts hereinafter described and particularly pointed out in the claims.

In the accompanying drawings:

Figure 1 is a side elevation and a part sectional view of one form of the invention;

Fig. 2 is a bottom plan view;

Fig. 3 is a view similar to Fig. 1, of a different form of the invention, to fish for and recover a different form of article or appliance from that for which the device shown in Fig. 1 is adapted;

Fig. 4 is a bottom plan view of the appliance shown in Fig. 3.

Fig. 5 is a rigid elevation of the plunger 7 carrying the cross pin 6.

Referring to Figs. 1 and 2, the main body of the fishing tool is made up of a cylindrical upper portion, 1, and an exteriorly tapered lower end, 2, which is toothed or corrugated for the purpose of gripping the article which is to be recovered. This main body is hollow and it is slit vertically at several points so as to provide resilient sections which may be spread radially in relation to each other for gripping the article when the tapered lower end of the fishing tool has entered the article or parts thereof.

In Fig. 1, 3 indicates the line upon which the main body is slitted at one point, and 4 indicates the slot or enlargement of the slit 3, the wall of the slot being indicated at 4'. At the point 5, above the upper end of the slot, the main body is continuous throughout its circuit. The slots receive a cross pin 6, carried by an inner plunger member 7, which is fitted to slide vertically within the bore of the main body, the upper end of the member 7 being screw-threaded at 8 to engage the lower end of the drill stem or pipe.

Within the bore of the main body a tapered wedge member 9 is located, this being of conical form with its point directed downwardly and engaging slightly inclined surfaces at 10 on the inner side of the sections of the main body. The upper large end of the cone is guided in the cylinder cavity or bore within the main body.

In the use of the device, it is attached by the screw threaded end 8 to the lower end of the drill stem and it is then lowered into the well, and after the toothed and pointed lower end of the main body has entered the article to be recovered, further downward movement of the drill will cause the plunger 7 to press upon the conical spreader 9 and thrust this downwardly along the inclined faces 10, the result being that the main body will be spread at its lower end and its toothed portion will be brought into gripping contact with the article and the drill stem, together with the fishing tool, and the engaged article may be lifted from the well.

In Fig. 2, the main body instead of being tapered at its lower end on its exterior, is provided with a toothed interior lower end and the cavity for receiving article to be recovered tapers upwardly slightly. The main body in this modification, like that previously described, is slit vertically so as to provide resilient sections or jaws and it is slotted as at 4ª to receive the cross pin 6ª, carried by the inner plunger member 7ª. The wedge member in this modification consists of a collar, 9ª, surrounding the main body 1ª and having an interior conical seating, to work against the inclined surfaces 10ª of the main body. This main body normally has its sections spread apart slightly, so as to receive between them a portion of the article to be recovered, and upon positioning, the fishing device in connection with the article further downward movement of the plunger 7ª, together with the drill stem will impose sufficient weight on the conical collar 9ª to thrust this downwardly and press inwardly the sections of the main body to cause the interior teeth thereof to grip the article to be recovered, whereupon the parts may be lifted from the well.

In both of the forms the suspension member 7 or 7ª is the intermediary through which the weight of the drill stem is imposed on the wedge member 9 or 9ª to set the jaws in gripping position and if desired, this suspension member may serve as a hammer to force the wedge member down by a succession of blows or actions. The head of the suspension member is arranged at such a distance above the main body that the upper end of the latter is left exposed so as to be tapped, if desired, for loosening the main body (Fig. 3) from the wedge to allow the jaws to relax.

It will be observed that the main body is of a simple one piece construction, its jaws being provided by slitting it from its lower end and the slip joint connection between the main body and the suspension device is simply made by the cross pin working in the slots of the body.

A portion of the drill stem to which the suspension member 7 is attached is indicated at X.

We claim:

1. A fishing tool for oil wells, comprising a main body having radially movable jaws at its lower end, connected together at their upper ends, a wedge member for pressing said jaws into engagement with the article to be recovered, a suspension member slidably mounted coaxially in relation to and within said main body, said wedge member acting upon the jaws to cause them to grip the part to be recovered, said wedge member being forced down, to set the jaws, through the intermediary of the suspension device substantially as described.

2. A fishing tool for oil wells and the like, comprising a main body member slitted vertically to provide radially movable jaws, connected together at their upper ends and vertically slotted to receive a cross pin, and having also a central bore, a suspension member slidably mounted in the upper bore of the main body, said member carrying said cross pin and a wedge member acting upon the jaws and pressed down to set the said jaws through the intermediary of the slidable suspension member substantially as described.

3. A fishing tool for oil wells, comprising a main body with a divided lower end forming jaws with interior gripping surfaces and adapted to receive the article between them said jaws having exterior surfaces inclined downwardly and outwardly, a collar surrounding the jaws and having an upwardly tapering interior, a suspension member, slidably mounted within the main body, said main body being slotted vertically and means extending from the suspension member through the slots to transmit pressure to the collar for moving the jaws radially inward for gripping the article, substantially as described.

4. A fishing tool for oil wells, comprising a main body with a divided lower end forming jaws with interior gripping surfaces and adapted to receive the article between them, said jaws having exterior surfaces inclined downwardly and outwardly, a collar surrounding the jaws and having an upwardly tapering interior, a suspension member, slidably mounted within the main body, and means extending from the suspension member through pressure to the collar for moving the jaws radially inward for gripping the article, said last mentioned means comprising a cross pin arranged to bear on the upper edge of the collar, substantially as described.

In testimony whereof, I affix my signature.

SAM SORENSEN.